May 17, 1938.   E. L. SMITH ET AL   2,117,517
DELIVERY DEVICE FOR WRAPPING MACHINES
Original Filed July 28, 1936
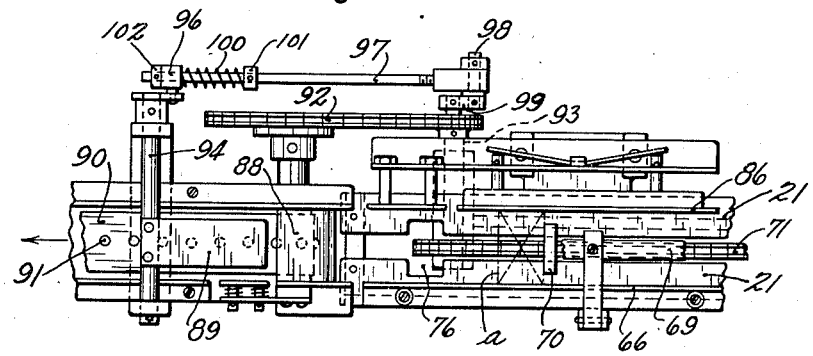
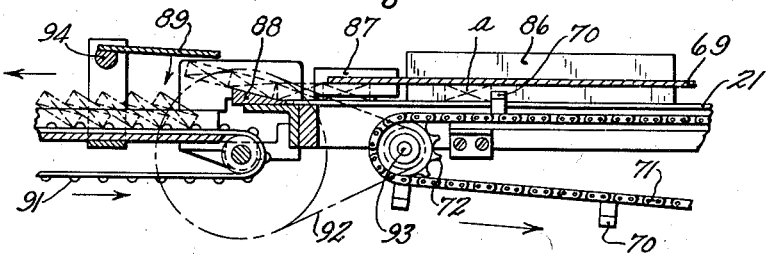
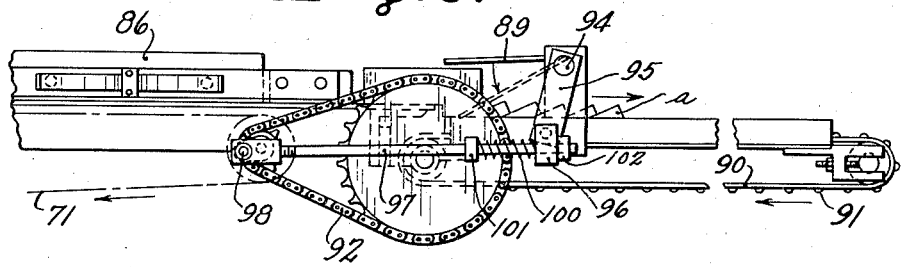
INVENTORS
ELMER L. SMITH AND
BY CARLTON WETSEL
Chapin + Neal
ATTORNEYS Patented May 17, 1938

2,117,517

UNITED STATES PATENT OFFICE 2,117,517

DELIVERY DEVICE FOR WRAPPING MACHINES

Elmer L. Smith, Longmeadow, and Carlton Wetsel, Springfield, Mass., assignors to Package Machinery Company, Springfield, Mass., a corporation of Massachusetts Original application July 28, 1936, Serial No. 92,972. Divided and this application July 16, 1937, Serial No. 154,036

3 Claims. (Cl. 198—35)

This invention relates to delivering devices for wrapping machines and has particular reference to mechanism which will receive articles in endless succession and will stack those articles on a conveyor belt in tilted overlapping relationship so that they may be easily picked up manually in groups.

This application is a division of our prior application Serial No. 92,972, filed July 28, 1936.

Referring to the drawing,

Fig. 1 is a fragmentary plan of the apparatus constituting the present invention;

Fig. 2 is a section thereof taken on the median line of the article delivering conveyors; and Fig. 3 is a side elevation looking in the opposite direction from Fig. 2.

The articles a are shown as being carried along a slotted plate 21 by pushers 70 on a chain conveyor 71, the pushers extending upwardly through the slot in the plate and passing downwardly through an enlargement 76 of this slot. The conveyor 71 is preferably driven continuously from any desired source of power. During their travel along the conveyor the articles are guided by side plates 66 and 86 and by a top plate 69.

The machine is designed for running at very high speeds, and it is necessary to change the articles from the spaced condition in which they are forwarded by the pushers 70 into abutting condition in which they can be removed from the delivery channel. Due to the high speed at which the machine is designed to operate it would be difficult to dispose of the wrapped packages with sufficient rapidity were they to be fed into the delivery chute in the customary end to end relation. In accordance with the present invention the articles are both tilted and overlapped so that they can be picked up manually in groups without handling the articles individually.

As the pushers 70 descend through the aperture 76 the articles are left upon the bed 21 and are carried forward from that point solely by the pressure of the articles following them. The wrapped articles are thus forced in a continuous stream up a slanting riser or ledge 88, and are kicked downwardly into the overlapping relationship shown in Figs. 2 and 3 by an oscillating paddle 89 which makes one downward stroke for each article. The high speed of the machine is here utilized for obtaining the desired relationship, since the articles are projected beyond the end of the riser with such speed that they do not have a chance to turn or fall until they are struck by the paddle and carried downwardly at the desired angle. They come to rest on a delivery conveyor 90 provided with spacing lugs 91 which support the articles the desired distance apart and with the proper slant so that they continue in their overlapping position. This delivery conveyor is driven as by a chain and sprocket connection 92 from the shaft 93 of the terminal sprocket 72 of the conveyor 71, and is hence driven in timed relation to that conveyor but at a lower speed.

The paddle 89 is secured to a shaft 94 journaled in suitable bearings and having fixed to it an arm 95 at the lower end of which is a collar 96 through which a rod 97 slides freely. The other end of this rod is pivoted to a crank pin 98 on a crank 99 carried by the shaft 93. A spring 100 bears against the collar 96 at one end and at the other against a collar 101 fixed on the rod 97. A second collar 102 also fixed to the rod bears against the side of the collar 96 opposite the spring. By this means the paddle is oscillated upwardly with a positive motion and downwardly with a yielding connection so that if the packages become jammed the paddle will not crush them.

We claim:

1. A stacking apparatus for wrapping machines and the like comprising means for forwarding articles along a channel, an upwardly inclined ledge along which the articles are moved, an oscillating paddle operable to strike the articles from the top and to move their rear ends downwardly faster than their front ends, and a conveyor receiving the articles moved downwardly by the paddle, said conveyor having a rate of progress such that the articles will be received upon it in overlapping position.

2. A stacking apparatus for wrapping machines and the like comprising means for forwarding articles along a channel, an upwardly inclined ledge along which the articles are moved, an oscillating paddle operable to strike the articles from the top and to move their rear ends downwardly faster than their front ends, the rate of progress of said forwarding means being such that the articles are moved with sufficient rapidity as not to fall a substantial extent before they are struck by the paddle, and a conveyor receiving the articles moved downwardly by the paddle, said conveyor having a rate of progress such that the articles will be received upon it in overlapped position.

3. A stacking apparatus for wrapping machines and the like comprising means for forwarding articles along a channel, an upwardly inclined ledge along which the articles are moved, an oscillating paddle operable to strike the articles from the top and to move their rear ends downwardly faster than their front ends, the rate of progress of said forwarding means being such that the articles are moved with sufficient rapidity as not to fall a substantial extent before they are struck by the paddle, and a conveyor receiving the articles moved downwardly by the paddle and having pushing flights thereon arranged at such a spacing that the articles can rest thereon only in overlapped position, the rate of progress of said conveyor being such that one flight is brought into position for the reception of each successive article.

ELMER L. SMITH.
CARLTON WETSEL.